(12) United States Patent
Fish et al.

(10) Patent No.: US 11,283,615 B2
(45) Date of Patent: Mar. 22, 2022

(54) SYSTEM AND METHOD FOR USER AUTHENTICATION AT A KIOSK FROM A MOBILE DEVICE

(71) Applicant: 19Labs, Inc., San Mateo, CA (US)

(72) Inventors: Ram Fish, Menlo Park, CA (US); Jerry Horel, Brentwood Bay (CA)

(73) Assignee: 19LABS, INC., San Mateo, CA (US)

( * ) Notice: Subject to any disclaimer, the term of this patent is extended or adjusted under 35 U.S.C. 154(b) by 365 days.

(21) Appl. No.: 16/264,152

(22) Filed: Jan. 31, 2019

(65) Prior Publication Data

US 2020/0084040 A1 Mar. 12, 2020

Related U.S. Application Data

(60) Provisional application No. 62/728,848, filed on Sep. 9, 2018.

(51) Int. Cl.
*H04L 9/32* (2006.01)
*G06Q 20/18* (2012.01)
*G06Q 20/32* (2012.01)

(52) U.S. Cl.
CPC ........... *H04L 9/3234* (2013.01); *G06Q 20/18* (2013.01); *G06Q 20/3224* (2013.01); *H04L 9/3226* (2013.01); *H04L 2209/76* (2013.01); *H04L 2209/80* (2013.01)

(58) Field of Classification Search
CPC . H04L 9/3234; H04L 9/3226; H04L 2209/80; H04L 2209/76; H04L 2209/805; H04L 2209/56; G06Q 20/18; G06Q 20/3224; G06Q 20/4014; G06Q 20/40; G06Q 20/40145; H04W 12/0471; H04W 4/80; H04W 12/63

USPC ........................................................ 713/185
See application file for complete search history.

(56) References Cited

U.S. PATENT DOCUMENTS

| | | |
|---|---|---|
| 8,661,249 B2 | 2/2014 | Guarraci |
| 9,047,648 B1 | 6/2015 | Lekutai |
| 9,100,392 B2 | 8/2015 | Hubner |
| 9,414,776 B2 | 8/2016 | Sillay |
| 9,438,587 B2 | 9/2016 | Hardy |
| 9,443,073 B2 | 9/2016 | Oberheide |
| 9,455,988 B2 | 9/2016 | Oberheide |
| 9,553,872 B2 | 1/2017 | Tippett |

(Continued)

FOREIGN PATENT DOCUMENTS

WO     2017/070638 A1     4/2017

*Primary Examiner* — Mohammad W Reza
(74) *Attorney, Agent, or Firm* — Inventive Law Inc.; Jim H. Salter

(57) ABSTRACT

A system and method for user authentication at a kiosk from a mobile device is disclosed. A particular embodiment is implemented for: configuring a kiosk to detect the presence of a mobile device in the proximity of the kiosk; configuring the mobile device to detect the presence of kiosk in the proximity of the mobile device; prompting a user of the mobile device to perform a login operation on the mobile device upon detection of the kiosk in the proximity of the mobile device; verifying the authentication of the user with the mobile device as a result of the login operation on the mobile device; and transferring unique kiosk session keys from the mobile device to the kiosk in proximity of the mobile device upon authentication of the user with the mobile device.

20 Claims, 9 Drawing Sheets

(56) References Cited

U.S. PATENT DOCUMENTS

| | | |
|---|---|---|
| 9,819,684 B2 | 11/2017 | Cernoch |
| 9,825,765 B2 | 11/2017 | Oberheide |
| 9,930,060 B2 | 3/2018 | Oberheide |
| 9,979,719 B2 | 5/2018 | Oberheide |
| 10,055,732 B1 | 8/2018 | Hecht |
| 10,078,425 B2 | 9/2018 | Ullrich |
| 2006/0106646 A1 | 5/2006 | Squilla |
| 2009/0066476 A1* | 3/2009 | Raheman ........... G07C 9/00904 340/5.64 |
| 2011/0191123 A1 | 8/2011 | Buzynski |
| 2011/0300803 A1* | 12/2011 | Hulvey ............... H04L 63/0492 455/41.2 |
| 2012/0059911 A1 | 3/2012 | Randhawa |
| 2015/0089607 A1 | 3/2015 | Hubner |
| 2015/0213661 A1* | 7/2015 | Robertson .......... G07C 9/00571 340/5.61 |
| 2015/0242601 A1 | 8/2015 | Griffiths |
| 2017/0141920 A1 | 5/2017 | Herder, III |
| 2018/0096547 A1 | 4/2018 | Robertson |

* cited by examiner

SYSTEM AND METHOD FOR USER AUTHENTICATION AT A KIOSK FROM A MOBILE DEVICE

PRIORITY PATENT APPLICATION

This non-provisional patent application draws priority from U.S. provisional patent application Ser. No. 62/728,848; filed Sep. 9, 2018. This present non-provisional patent application draws priority from the referenced patent application. The entire disclosure of the referenced patent application is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017-2019 19Labs, Inc., All Rights Reserved.

TECHNICAL FIELD

This patent application relates to computer-implemented software systems, user authentication, mobile devices, kiosk systems, according to various embodiments, and more specifically to a system and method for user authentication at a kiosk from a mobile device

BACKGROUND

In many cases, it is convenient for people to use kiosks to perform various transactions. For example, automatic teller machines (ATMs) enable a user to withdraw cash from a user bank account without interacting with a human teller. Airports use kiosks to enable ticket purchase or check-in without human interaction. The healthcare industry can also benefit from the use of kiosks for the capture, processing, retention, and presentation of routine user/patient medical data, such as blood pressure, heartrate, temperature, blood glucose level, and the like, again without the need for human interaction. However, the use of kiosks can be cumbersome and time-consuming for users, especially when private data is shared with the kiosk. In most cases, the user must perform an authentication protocol prior to engaging in a data sharing transaction with a kiosk. Typically, these authentication protocols involve the entry of a user identifier and a password by the user. However, users are often unable to remember user identifiers and passwords, so the kiosk interaction is frustrating and intractable. As a result, widespread adoption of kiosk usage is less than desirable.

SUMMARY

In various example embodiments described herein, a system and method for user authentication at a kiosk from a mobile device is disclosed. In the various example embodiments described herein, a computer-implemented tool or software application (app) as part of a user authentication system is described to automate and improve the authentication of a user at a kiosk by use of a mobile device. As described in more detail below, a computer or computing system on which the described embodiments can be implemented can include, personal communication devices (e.g., cellular telephones, smartphones, or other wireless devices), personal digital assistants (PDAs), portable computing devices, laptops, tablet computers, network computers, consumer electronic devices, wearable computing devices, or any other type of computing, data processing, communication, networking, or electronic system. In various example embodiments described herein, the user authentication system allows a user to easily and quickly perform a login operation (including a user authentication operation) at a kiosk by use of a mobile device. Because many existing mobile devices already support robust user authentication protocols, such as electronic wallets, password repositories, and biometric systems, the user authentication system of the example embodiments is able to leverage these mobile device authentication protocols for user/kiosk authentication while maintaining the same level of security. Further details of the various example embodiments are described below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for user authentication at a kiosk from a mobile device is disclosed. In the various example embodiments described herein, a computer-implemented tool or software application (app) as part of a user authentication system is described to automate and improve the authentication of a user at a kiosk by use of a mobile device. As described in more detail below, a computer or computing system on which the described embodiments can be implemented can include, personal communication devices (e.g., cellular telephones, smartphones, or other wireless devices), personal digital assistants (PDAs), portable computing devices, laptops, tablet computers, network computers, consumer electronic devices, wearable computing devices, or any other type of computing, data processing, communication, networking, or electronic system. In various example embodiments described herein, the user authentication system allows a user to easily and quickly perform a login operation (including a user authentication operation) at a kiosk by use of a mobile device. Because many existing mobile devices already support robust user authentication protocols, such as electronic wallets, password repositories, and biometric systems, the user authentication system of the example embodiments is able to leverage these mobile device authentication protocols for user/kiosk authentication while maintaining the same level of security. Further details of the various example embodiments are described below.

Figure 1:
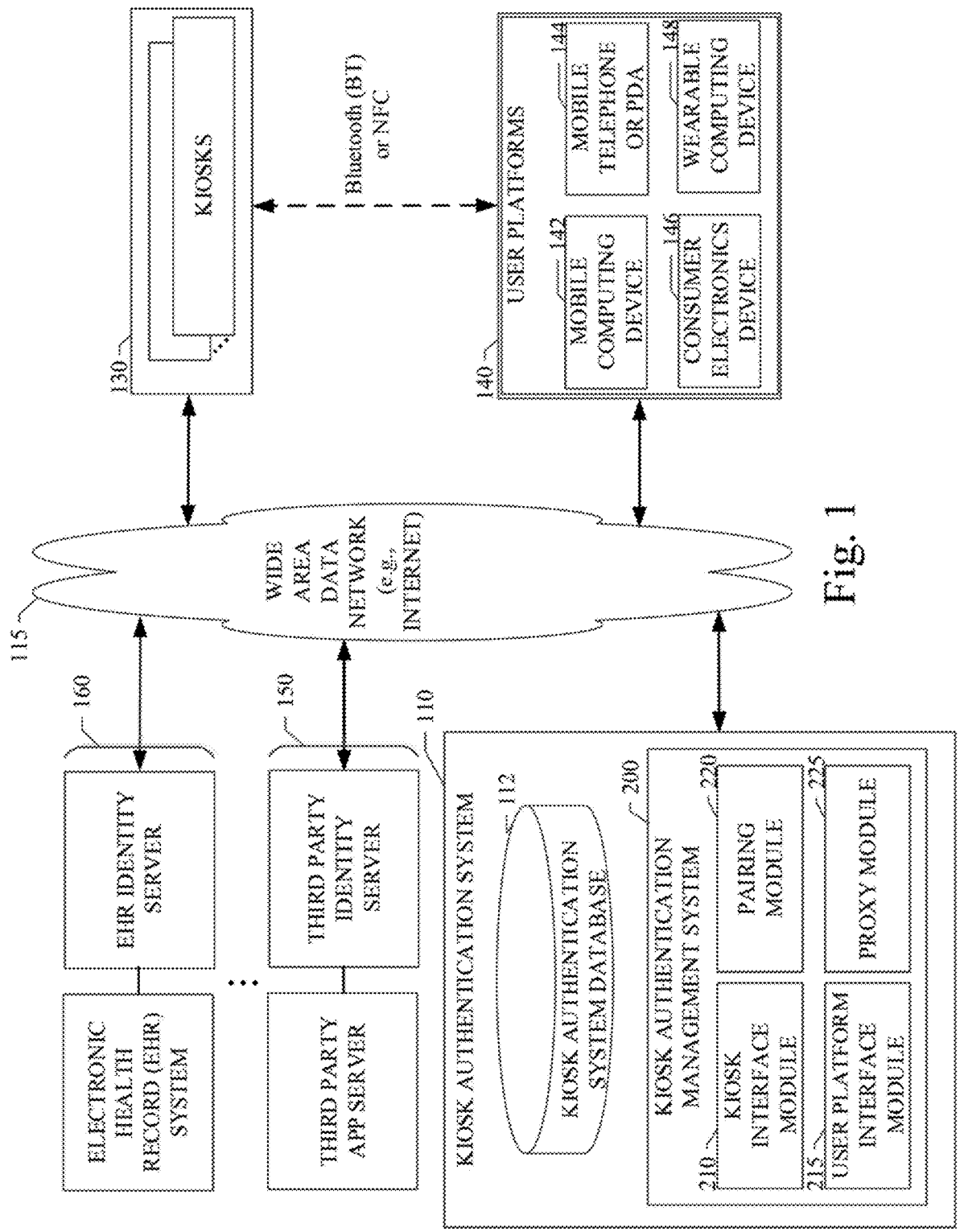
FIG. 1 illustrates an example embodiment of a networked system in which various embodiments may operate.

FIG. 1, in an example embodiment, illustrates a system and method for user authentication at a kiosk from a mobile device of a user platform. In various example embodiments, an application or service, typically provided by or operating on a host site (e.g., a server) 110, is provided to simplify and facilitate the use of the kiosk authentication management system 200 of an example embodiment. In a particular embodiment, the kiosk authentication management system 200 can be hosted by the host site 110 for a networked user at a user platform 140 and a kiosk 130 of a plurality of available kiosks. As used herein, the term 'kiosk' denotes a small structure, typically in a public area, that is used for accepting input from a user and providing information or displaying results to a user. The kiosk often incorporates a data processor and an interactive display screen or screens. The details of the kiosk authentication management system 200 and the kiosks for an example embodiment are provided below.

Referring again to FIG. 1, the kiosk authentication management system 200 can be in network communication with a plurality of kiosks 130. The kiosks 130 can include user input devices, sensor devices, medical devices, communication devices, and/or network resources at which a user/consumer can provide input and receive a presentation of information from the kiosk 130. The kiosk 130 can also provide a portal for the user/consumer to access other third party sites, such as other third party authentication sites 150 or electronic health record (EHR) sites 160. The kiosk authentication management system 200 can be configured to provide data communications and authentication services for user/consumers at the user platforms 140 serving as networked platforms for user/consumers to authenticate with a kiosk 130 and subsequently provide or obtain user/consumer information, medical information, advisory information, and the like in a digital or computer-readable form via the network 115. The kiosks 130 can include user input devices, sensor devices, medical devices, communication devices, and/or network resources configured to serve as networked platforms for user/consumers to provide or obtain consumer information including, consumer profile information, consumer medical information, advisory information, consumer product interests, or other consumer-related information. The kiosk authentication management system 200 can be configured to facilitate the collection and presentation of this consumer information at a kiosk 130 and/or a user device at a user platform 140 in a digital or computer-readable form via the network 115. The kiosk authentication management system 200 can also be in network data communication with a plurality of other information sites, such as third party authentication sites 150, electronic health record (EHR) sites 160, and the like. These types of third party authentication sites 150 and electronic health record (EHR) sites 160 are well known to those of ordinary skill in the art.

One or more of the kiosks 130 can be provided by one or more third party providers operating at various locations in a network ecosystem. It will be apparent to those of ordinary skill in the art that kiosks 130 can include or be any of a variety of networked third party information collectors/providers or on-line vendors or merchants as described in more detail below. In a particular embodiment, a resource list maintained at the host site 110 can be used as a summary or list of all kiosks 130, which users at user platforms 140 or the host site 110 may visit/access and from which users or the host site 110 can obtain or present consumer data. The host site 110, the plurality of kiosks 130, the user platforms 140, third party authentication sites 150, and electronic health record (EHR) sites 160 may communicate and transfer data and information in the data network ecosystem shown in FIG. 1 via a wide area data network (e.g., the Internet) 115. As described in more detail below, the kiosks 130 and the user platforms 140 may also directly communicate wirelessly while in close proximity using conventional wireless data communication technologies, such as Bluetooth™ (BT) and/or Near-field Communication (NFC). BT and NFC are different sets of communication protocols that enable two electronic devices, one or both of which is usually a portable or mobile device such as a smartphone, to establish communication by bringing the devices within close proximity.

Network 115 is configured to couple one computing device with another computing device. Network 115 may be enabled to employ any form of computer readable media for communicating information from one electronic device to another. Network 115 can include the Internet or a local area network (LAN), wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Network 115 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 115 may also include an autonomous system of terminals, gateways, routers, and the like connected by wireless radio links or wireless transceivers. These connectors may be configured to move freely and randomly and organize themselves arbitrarily, such that the topology of network 115 may change rapidly and arbitrarily.

Network 115 may further employ a plurality of access technologies including 2nd (2G), 2.5, $3^{rd}$ (3G), $4^{th}$ (4G), $5^{th}$ (5G) generation radio access for cellular systems, WLAN, Wireless Router (WR) mesh, and the like. Access technologies such as 2G, 3G, 4G, 5G, and future access networks may enable wide area coverage for mobile devices, such as one or more of client devices 140, with various degrees of mobility. For example, network 115 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 115 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, network 115 may include virtually any wired and/or wireless communication mechanisms by which information may travel between one computing device and another computing device, network, and the like. In one embodiment, network 115 may include a LAN that is configured behind a firewall (not shown), within a business data center, for example.

Kiosks 130 may include data processing components to collect or provide any of a variety of network transportable digital data. The network transportable digital data can be transported in any of a family of file formats and associated mechanisms usable to enable a host site 110 and a user platform 140 to provide or receive user/consumer data over the network 115. In example embodiments, the file format can be any conventional or proprietary data interchange format supported by the various embodiments described herein. Moreover, the kiosks 130 or user platforms 140 may provide or use a variety of different data sets or computational modules.

In a particular embodiment, a user platform 140 with one or more client devices enables an authorized user, as authorized by the kiosk authentication management system 200 via the host 110 and network 115, to access data provided or collected by a kiosk 130. Client devices of user platform 140 may include virtually any computing device that is configured to send and receive information over a network, such as network 115. Such client devices of user platform 140 may include portable or mobile computing devices 142, such as handheld computers, laptops, tablet computers, integrated devices combining one or more of the preceding devices, and the like. The client devices 142 may also include other computing devices, such as personal computers, multiprocessor systems, microprocessor-based or programmable electronics, network PC's, and the like. Such client devices of user platform 140 may also include portable or mobile communication devices 144, such as cellular telephones, smartphones, smartwatches, camera phones, display pagers, radio frequency (RF) devices, infrared (IR) devices, global positioning devices (GPS), Personal Digital Assistants (PDAs), or the like. The client devices of user platform 140 may also include other data processing devices, such as consumer electronic (CE) devices 146 and/or wearable computing devices 148, which are known to those of ordinary skill in the art. As such, the client devices of user platform 140 may range widely in terms of capabilities and features. A web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices of user platform 140 can be configured with applications (apps) with which the functionality described herein can be implemented and/or supported.

The client devices of user platform 140 may also include at least one client application that is configured to provide or receive consumer data and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 1, the kiosk authentication management system 200 for an example embodiment is shown to include a kiosk authentication system database 112. The database 112 can be used to retain a variety of information data sets including, but not limited to, user/consumer information, authentication information, kiosk configuration information, user platform configuration information, public/private keys, user/consumer analytics, and the like. It will be apparent to those of ordinary skill in the art that the kiosk authentication system database 112 can be locally resident at the host site 110 or remotely located at other server locations or stored in network cloud storage.

Referring again to FIG. 1, host site 110 of an example embodiment is shown to include the kiosk authentication management system 200. In an example embodiment, kiosk authentication management system 200 can include a kiosk interface module 210, a user platform interface module 215, a pairing module 220, and a proxy nodule 225. Each of these modules can be implemented as software components executing within an executable environment of kiosk authentication management system 200 operating on host site 110. Each of these modules of an example embodiment is described in more detail below in connection with the figures provided herein.

Referring still to FIG. 1, the kiosk authentication management system 200 can include a kiosk interface module 210 and user platform interface module 215. The kiosk interface module 210 can facilitate communication and the transfer of data between a user at a kiosk 130 and the host site 110. The user platform interface module 215 can facilitate communication and the transfer of data between a user of a mobile device at a user platform 140 and the host site 110. The pairing module 220 can facilitate and authorize the pairing of and communication between a particular kiosk 130 and a particular user mobile device of a user platform 140. The proxy module 225 can facilitate the communication between a particular kiosk 130 or a particular user mobile device of a user platform 140 with a third party server 150 or an EHR system 160. The kiosk interface module 210, the user platform interface module 215, the pairing module 220, and the proxy module 225 can be configured to perform the processing as described in more detail below. The kiosk interface module 210 and the user platform interface module 215 can be resident at the host site 110 or partially resident on the user platforms 140. The kiosk authentication management system 200 can be configured to provide user authentication and data communications for the kiosks 130 and the mobile devices of user platforms 140 to enable the networked usage, transfer, or downloading of information, requests, images, documents, and related data to facilitate the gathering, processing, validation, and presentation of consumer information related to a user/consumer transaction at a kiosk 130. The components and processes for the gathering, processing, validation, and presentation of consumer information related to a user/consumer transaction at a kiosk 130 as embodied in the kiosk authentication management system 200, the kiosk 130, and the mobile device of a user platform 140 are described in more detail below.

Figure 2:
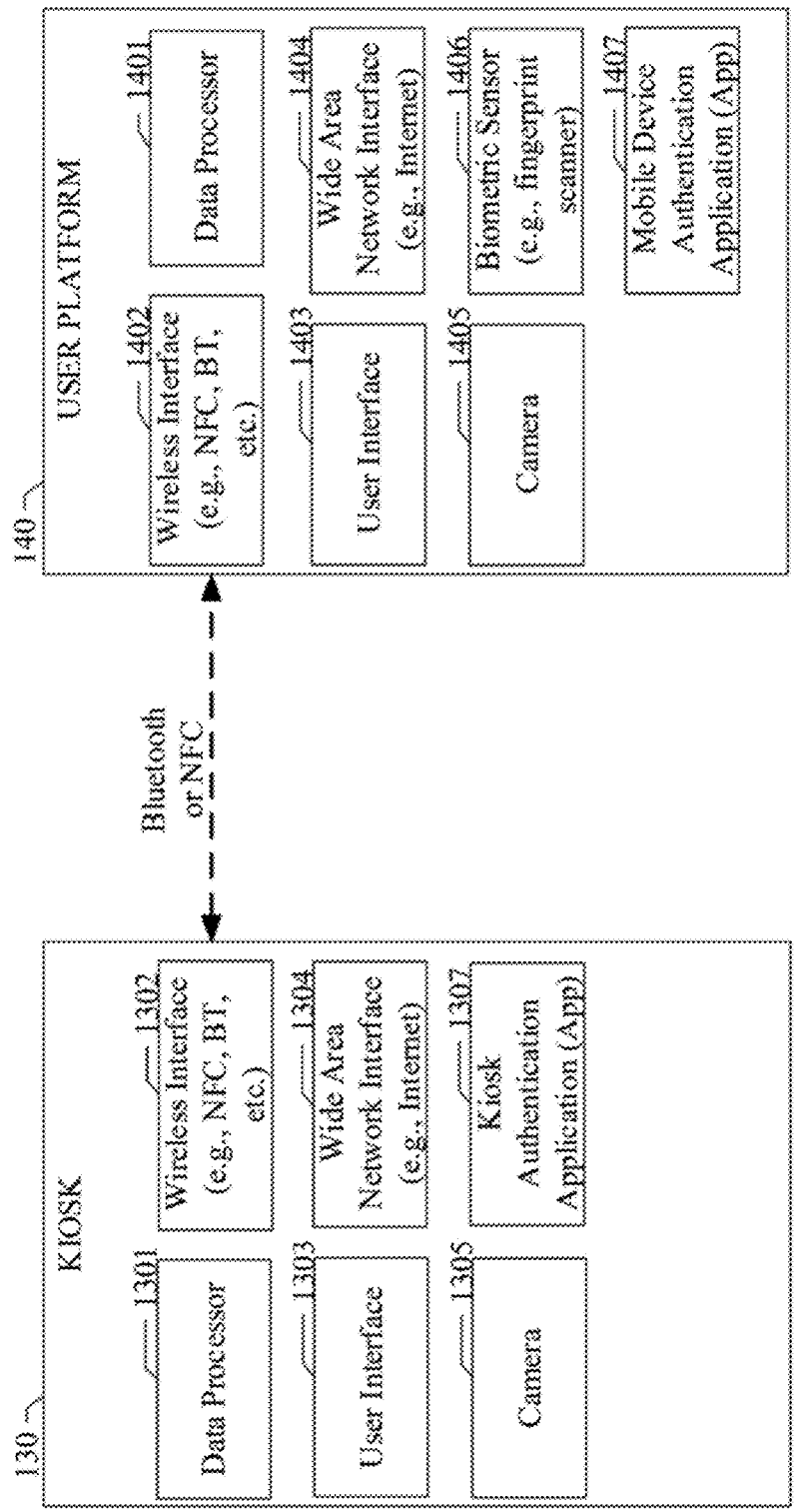
FIG. 2 illustrates the basic components of the kiosk and the user platform of an example embodiment.

FIG. 2 illustrates the basic components of the kiosks 130 and the user platforms 140 of an example embodiment. In an example embodiment, the kiosks 130 can include a data processor 1301, a wireless data network interface 1302, a user interface 1303, a wide area data network interface 1304, a camera or other image capture device 1305, and a kiosk authentication application (app) 1307. The data processor 1301 can be any standard data processor, microprocessor, or computing system, or data processing system. The wireless data network interface 1302 can include standard data interfaces and protocols for wirelessly exchanging data via NFC or Bluetooth™. Other conventional wireless communication protocol, such as IEEE 802.11x may also be used in alternative embodiments. The user interface 1303 can include the hardware and software elements to present information to a user of the kiosk 130 and the elements to receive user input. The user interface 1303 can include conventional display devices, input buttons or softkeys, mouse or trackball devices, gesture recognition devices, visual or audio input devices, voice recognition devices, or the like. The wide area data network interface 1304 can include standard data interfaces and protocols for exchanging data via a wide area network, such as the Internet, local area networks (LANs), or other network ecosystems. The camera or other image capture device 1305 can include standard video cameras, still image cameras, specialized imaging cameras, or the like. The kiosk authentication application (app) 1307 comprises a set of data processor 1301 instructions that are locally resident and executed on the kiosk 130. The kiosk authentication app 1307 can be downloaded to the kiosk 130 via the wide area data network interface 1304 and stored in a memory device of the kiosk 130. Alternatively, the kiosk authentication app 1307 can be installed on the kiosk 130 as firmware or logic devices. The kiosk authentication app 1307 can be executed by the data processor 1301. The details of the functionality implemented by the kiosk authentication app 1307 are described below. It will be apparent to those of ordinary skill in the art in view of the disclosure herein that other features, hardware, and software elements can be provided in or by a particular kiosk 130. By their application, kiosks 130 tend to vary widely in the features offered for the particular application. For example, some kiosks 130 can include credit card readers, printers, or the like. Nevertheless, the authentication techniques disclosed herein can be used across a broad range of specially configured kiosk systems.

In an example embodiment, the user platforms 140 (e.g., a user mobile device) can include a data processor 1401, a wireless data network interface 1402, a user interface 1403, a wide area data network interface 1404, a camera or other image capture device 1405, a biometric sensor input device 1406, and a mobile device authentication application (app) 1407 locally resident and executed on the mobile device 140. The data processor 1401 can be any standard data processor, microprocessor, or computing system, or data processing system. The wireless data network interface 1402 can include standard data interfaces and protocols for wirelessly exchanging data via NFC or Bluetooth™. Other conventional wireless communication protocol, such as IEEE 802.11x may also be used in alternative embodiments. The user interface 1403 can include the hardware and software elements to present information to a user of the user platform 140 and the elements to receive user input. The user interface 1403 can include conventional display devices, input buttons or softkeys, mouse or trackball devices, gesture recognition devices, visual or audio input devices, voice recognition devices, or the like. The wide area data network interface 1404 can include standard data interfaces and protocols for exchanging data via a wide area network, such as the Internet, local area networks (LANs), or other network ecosystems. The camera or other image capture device 1405 can include standard video cameras, still image cameras, specialized imaging cameras, or the like. The biometric sensor input device 1406 can include fingerprint scanners, retinal scanners, face or voice recognition devices, or other devices configured to capture biometric data from a user. The mobile device authentication application (app) 1407 can be a set of data processor 1401 instructions that are locally resident and executed on the mobile device 140. The mobile device authentication app 1407 can be downloaded via the wide area data network interface 1404 and stored in a memory device of the mobile device 140. The mobile device authentication app 1407 can be executed by the data processor 1401. It will be apparent to those of ordinary skill in the art in view of the disclosure herein that other features, hardware, and software elements can be provided in or by a particular user platform 140. In the various embodiments described herein, a mobile device, such as a smartphone, can be used as the user platform 140. Nevertheless, the authentication techniques disclosed herein can be used across a broad range of commercially available user platform systems.

Kiosks 130 are used in a variety of locations and applications. Often, these locations are in public venues. However, because users typically share private and relevant personalized information, kiosks 130 require the user to authenticate with the kiosk 130 prior to sharing confidential information. In most cases, the kiosk 130 requires a user to enter a user identifier (userid) and a password or passcode. However, the entry of the userid and/or the password can be problematic as users typically forget their userid and/or passwords. Many users store their userids and/or passwords on their mobile devices, such as a smartphones, which enable the user to not have to remember the userids or passwords. In some cases, userids or other user credentials are connected with biometric authentication devices and protocols that are available on many standard mobile devices, such as the iPhone™. As a result, the user cannot produce their userid and/or passwords, cannot authenticate with the kiosk 130 and thus, cannot use the kiosk 130.

To solve this problem with kiosk 130 authentication, the example embodiments disclosed herein allow the user to easily log into the kiosk 130 using their mobile device, such as a smartphone. In this manner, the authentication devices and protocols that are available on many standard mobile devices can be easily leveraged and used for logging into a kiosk 130 without having to remember a userid or password. Additionally, the biometric authentication devices and protocols and credential wallets that are available on many standard mobile devices can also be easily leveraged and used for logging into a kiosk 130, while maintaining a high level of security.

In the various example embodiments described herein, a three stage user authentication protocol is used as summarized below. Prior to the operational use of the user authentication protocol as described herein, the kiosk authentication app 1307 can be downloaded or otherwise installed on the kiosk 130. Similarly, the mobile device authentication app 1407 can be downloaded or otherwise installed on the mobile device 140. In an example embodiment, the three stage user authentication protocol to authenticate a user at a kiosk 130 via a user mobile device 140 can be implemented as follows:

Stage 1. Pairing—The kiosk 130 is configured to detect the presence of a user mobile device 140 in the proximity of the kiosk 130. The user mobile device 140 can also be configured to detect the presence of a kiosk 130 in the proximity of the mobile device 140. The detection of the user mobile device 140 and/or kiosk 130 can be performed using the wireless data network interface 1302 of the kiosk 130 and the wireless data network interface 1402 of the mobile device 140. In an alternative embodiment, the user can also be prompted to enter a passcode or PIN from the kiosk 130 (via user interface 1303) to provide a level of user authentication. In some cases, based on the security level of the pairing or the application used, the confirmation might be automatic. In this case, after the Stage 1 pairing, the mobile device 140 can pass a secure token to the kiosk 130, and/or report the pairing to the kiosk authentication system server 110. The passcode or PIN can be presented to the user on the kiosk 130 or the mobile device 140, requiring entry on the opposite device.

Stage 2. User Authentication—Upon detection of a user mobile device 140 in the proximity of the kiosk 130, the kiosk authentication app 1307 can prompt a user of the mobile device 140 to perform a login operation on their mobile device 140. Similarly, upon the detection of a kiosk 130 in the proximity of the user mobile device 140, the mobile device authentication app 1407 can prompt the user of the mobile device 140 to perform a login operation on their mobile device 140. The login operation performed by the user on their mobile device 140 can be the standard authentication method used for the particular type of mobile device 140. The standard authentication method for some mobile devices 140 is the entry of a password or passcode. The standard authentication method for other mobile devices 140 is the use of a biometric sensor, such as a fingerprint scanner or facial recognition system. In either case, the example embodiments described herein can leverage the standard authentication methods for mobile devices 140 to verify authentication of the user with the mobile device 140 detected in proximity of the kiosk 130. The mobile device authentication app 1407 can validate the authentication of the user with the mobile device 140.

Stage 3. Key Transfer—Once the authentication of the user with the mobile device 140 detected in proximity of the kiosk 130 is validated, the mobile device authentication app 1407 can transfer unique kiosk session keys from the mobile device 140 to the kiosk 130 in proximity of the mobile device 140. The transfer of the unique kiosk session keys from the user mobile device 140 to the kiosk 130 can be performed using a secure protocol of the wireless data network interface 1302 of the kiosk 130 and the wireless data network interface 1402 of the mobile device 140. Once the kiosk 130 receives the unique kiosk session keys from the mobile device 140 via the secure wireless protocol, the kiosk authentication app 1307 can use the unique kiosk session keys to validate the authentication of the user with the mobile device 140 and with the kiosk 130 in proximity of the mobile device 140. As a result, the kiosk authentication app 1307 can use the unique kiosk session keys to authenticate and enable the user with the mobile device 140 to initiate a session on the kiosk 130 without requiring the user to perform a separate authentication process on the kiosk 130. In another example embodiment, the unique kiosk session keys can be sent to the kiosk 130 via a NFC bump process. The NFC bump process is a well-known for direct device data transfer. In another example embodiment, the unique kiosk session keys can be sent to the kiosk 130 via a proxy server. The proxy module 225 of the kiosk authentication management system 200 and the wide area data network interface 1304 of the kiosk 130 can be used for this process. In an example embodiment, the unique kiosk session keys can be represented as an encrypted token comprising a combination of the user identifier and a session identifier. Once the authentication of the user with the mobile device 140 detected in proximity of the kiosk 130 is validated and the unique kiosk session keys are sent from the mobile device 140 to the kiosk 130 in proximity of the mobile device 140, the user has been authorized at both the mobile device 140 and the proximate kiosk 130. At this point, the user can also be authorized to access a third party application system server 150 or electronic health record (EHR) sites 160 as described above. The unique kiosk session keys associated with the particular user and corresponding mobile device 140 can be used to authenticate the user with the third party application system server 150 or electronic health record (EHR) sites 160. The unique kiosk session keys can be sent directly to the third party application system server 150 or electronic health record (EHR) sites 160 for authenticated login or sent via a proxy server. As such, the mobile device 140 authentication processes as described herein can be used to integrate mobile devices 140, kiosks 130, and third party application system server 150 or electronic health record (EHR) sites 160.

Figure 3:
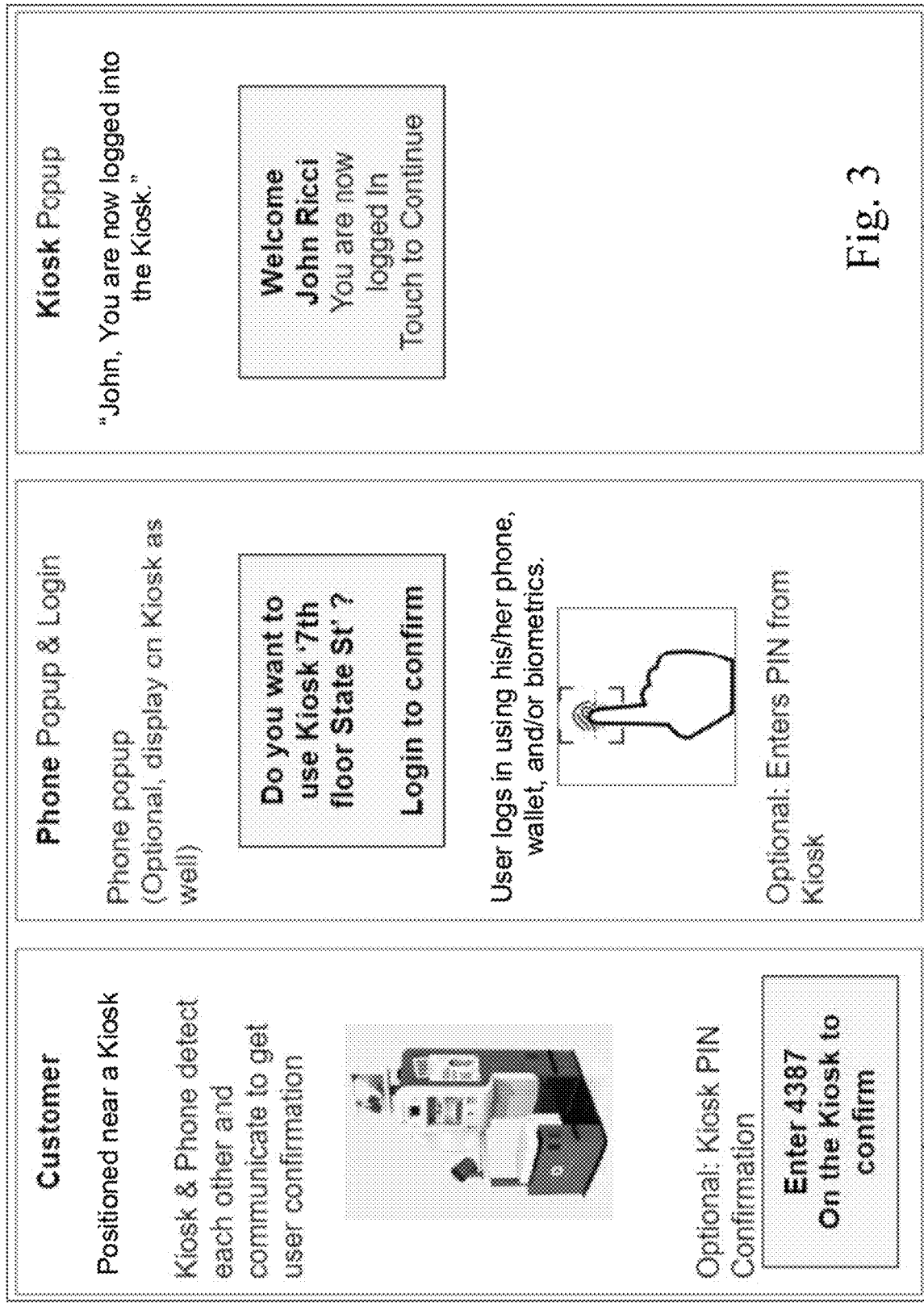
FIG. 3 illustrates a user interface example of a user login at a kiosk from a mobile device of a user platform according to an example embodiment of a method as described herein.

FIG. 3 illustrates a user interface example of a user login at a kiosk from a mobile device of a user platform according to an example embodiment of a method as described herein. As shown in FIG. 3 at Stage 1 (301), a user of a user mobile device 140 is detected in the proximity of a kiosk 130. The user mobile device 140 can also be configured to detect the presence of a kiosk 130 in the proximity of the mobile device 140. Upon detection of the proximity of the kiosk 130 and the mobile device 140, the kiosk 130 and the mobile device 140 can exchange user information and/or device configuration information. This user information and/or device configuration information can include a user identity, a mobile device 140 identifier (e.g., a MAC address or IP address), a kiosk 130 identifier (e.g., a MAC address or IP address), a kiosk 130 geographical location (e.g., GPS coordinates or location description), a kiosk 130 type or model code, a kiosk 130 configuration, and/or the like.

As shown in FIG. 3 at Stage 2 (302), upon detection of a user mobile device 140 in the proximity of the kiosk 130, the kiosk authentication app 1307 can prompt a user of the mobile device 140 to perform a login operation on their mobile device 140. Similarly, upon the detection of a kiosk 130 in the proximity of the user mobile device 140, the mobile device authentication app 1407 can prompt the user of the mobile device 140 to perform a login operation on their mobile device 140. The user prompt can be a popup message presented on the display of the user's mobile device 140 (e.g., user interface 1403) and/or a message presented on the display device of the kiosk 130 (e.g., user interface 1303). The login operation performed by the user on their mobile device 140 can be the standard authentication method used for the particular type of mobile device 140. The standard authentication method for some mobile devices 140 is the entry of a password or passcode. The standard authentication method for other mobile devices 140 is the use of a biometric sensor, such as a fingerprint scanner or facial recognition system. In either case, the example embodiments described herein can leverage the standard authentication methods for mobile devices 140 to verify authentication of the user with the mobile device 140 detected in proximity of the kiosk 130. The mobile device authentication app 1407 can validate the authentication of the user with the mobile device 140.

As shown in FIG. 3 at Stage 3 (303), once the authentication of the user with the mobile device 140 detected in proximity of the kiosk 130 is validated, the mobile device authentication app 1407 can send unique kiosk session keys from the mobile device 140 to the kiosk 130 in proximity of the mobile device 140. The transfer of the unique kiosk session keys from the user mobile device 140 to the kiosk 130 can be performed using a secure protocol of the wireless data network interface 1302 of the kiosk 130 and the wireless data network interface 1402 of the mobile device 140. In various example embodiments, the mobile device 140 can transfer the unique secure session keys to the kiosk 130 in various ways including: (i) transfer via the wide area network 115 through the kiosk authentication system server 110 and pairing module 220; (ii) transfer through a direct link to the kiosk 130 via IP communication (e.g., the mobile device 140 obtained the IP address of the kiosk 130 during the pairing process); or (iii) transfer through a direct link to the kiosk 130 via Bluetooth™ (e.g., the mobile device 140 obtained the MAC address of the kiosk 130 during the pairing process). Once the kiosk 130 receives the unique kiosk session keys from the mobile device 140 via the secure wireless protocol, the kiosk authentication app 1307 can use the unique kiosk session keys to validate the authentication of the user with the mobile device 140 and with the kiosk 130 in proximity of the mobile device 140. As a result, the kiosk authentication app 1307 can use the unique kiosk session keys to authenticate and enable the user with the mobile device 140 to initiate a session on the kiosk 130 without requiring the user to perform a separate authentication process on the kiosk 130. The kiosk authentication app 1307 can present a welcome message to the user via user interface 1303.

Figure 4:
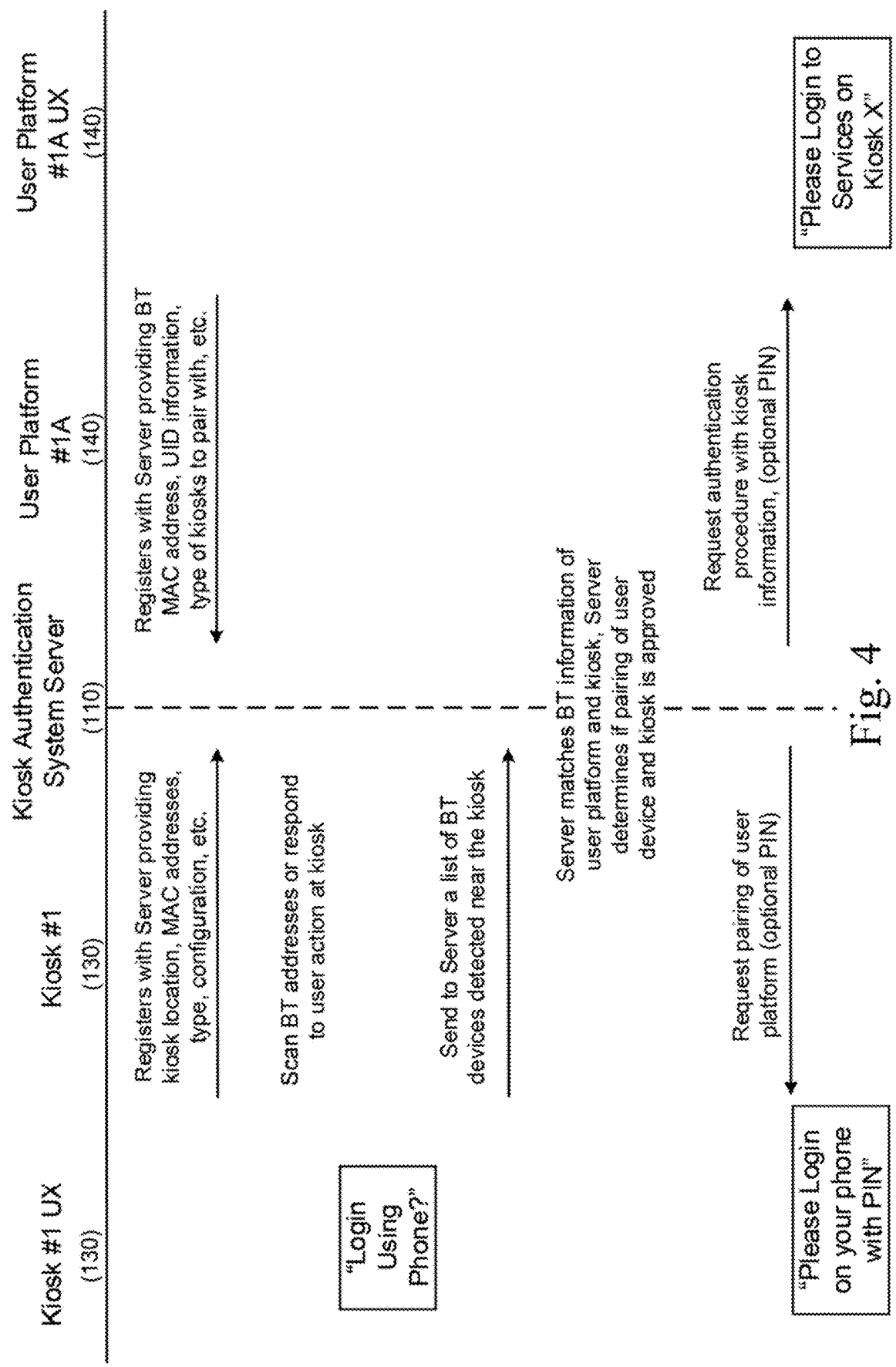
FIG. 4 illustrates an operational sequence diagram showing an example of a user device at a user platform being automatically paired with a kiosk according to an example embodiment of a method as described herein.
Figure 5:
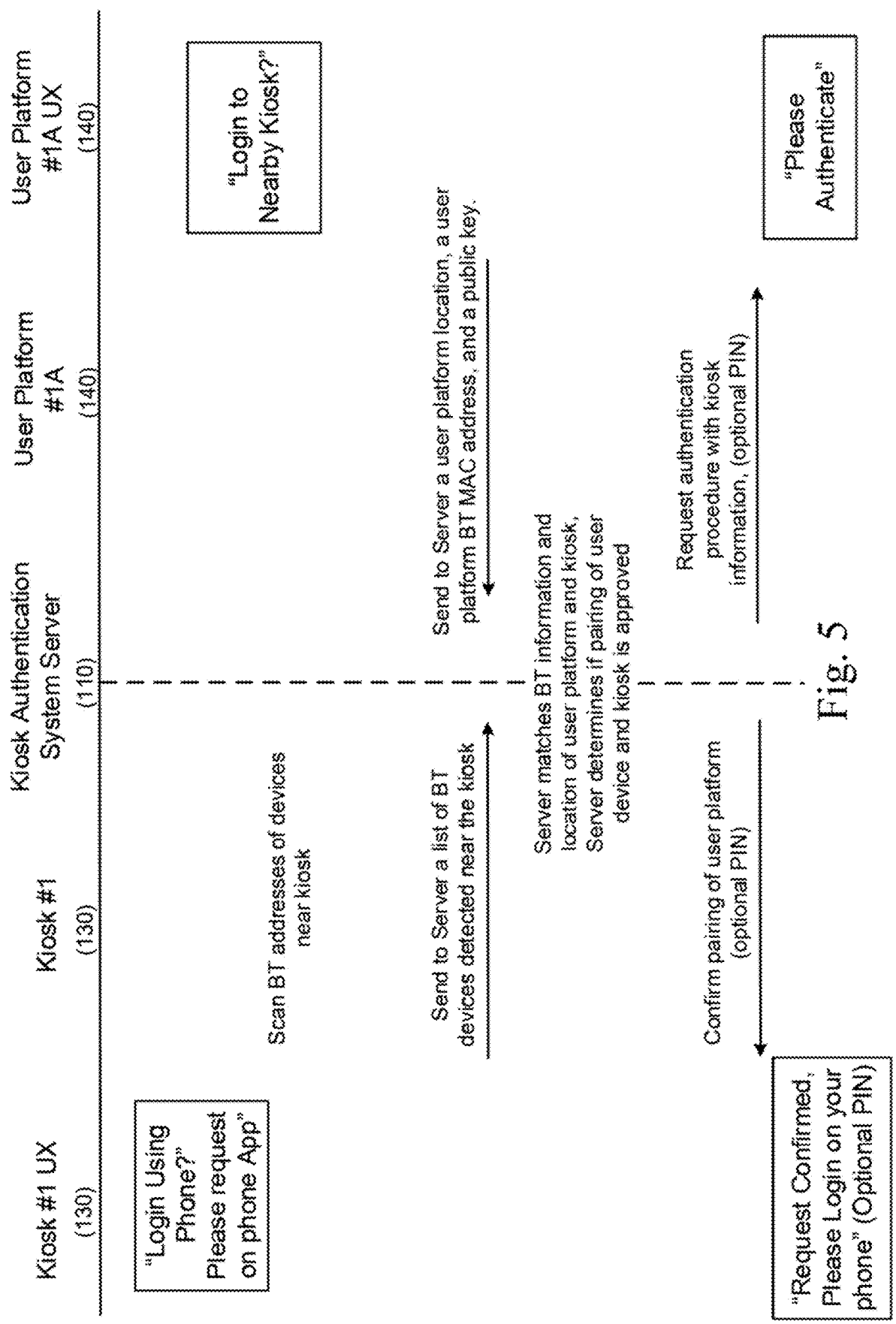
FIG. 5 illustrates an operational sequence diagram showing an example of a user device at a user platform performing a real-time or manual pairing with a kiosk according to an example embodiment of a method as described herein.
Figure 6:
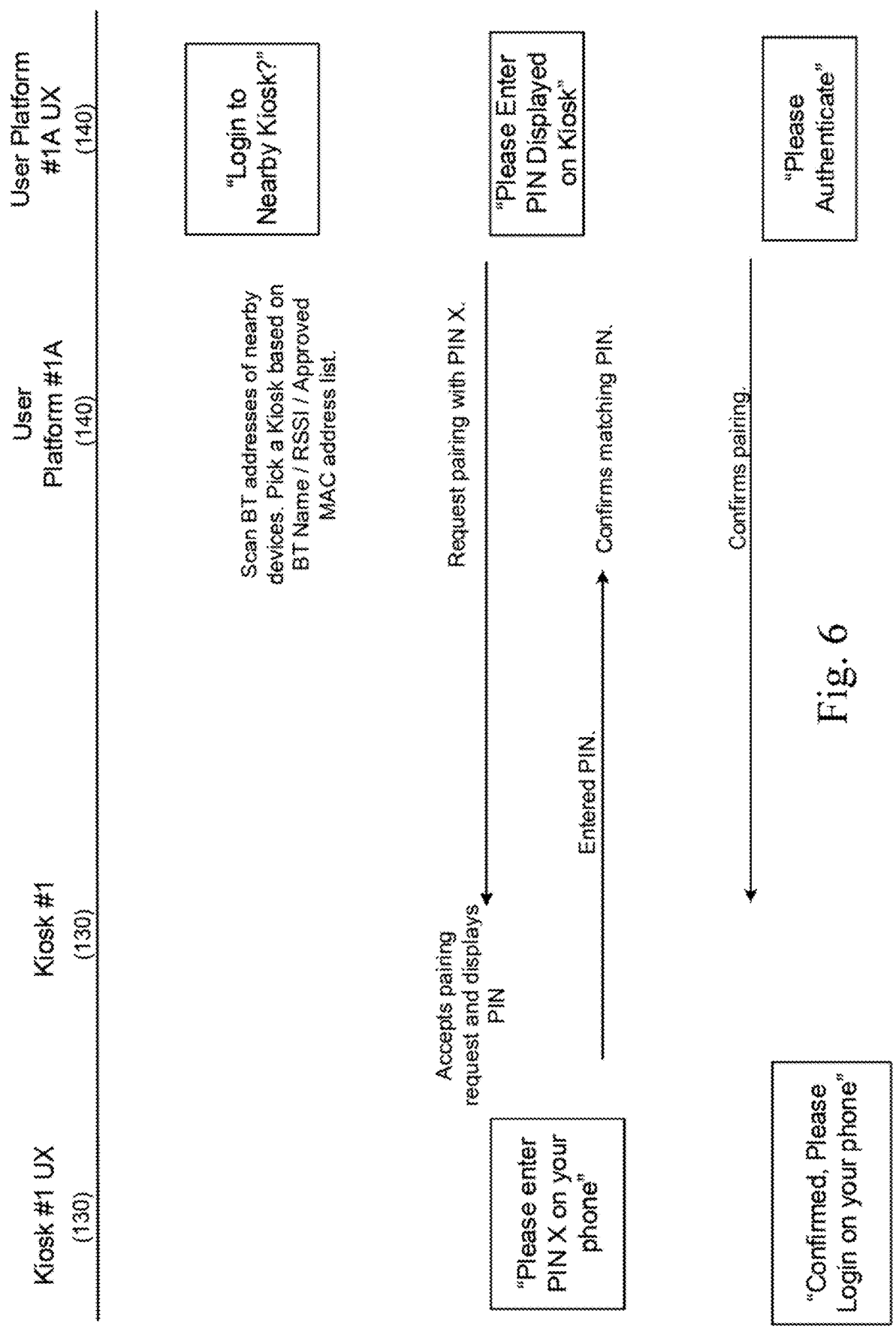
FIG. 6 illustrates an operational sequence diagram showing an example of a user device at a user platform performing a direct pairing with a kiosk according to an example embodiment of a method as described herein.

FIGS. 4 through 6 illustrate various examples of the Stage 1 processing of an example embodiment. FIG. 4 illustrates an operational sequence diagram showing an example of a user device at a user platform being automatically paired with a kiosk according to an example embodiment of a method as described herein. The operational sequence diagram of FIG. 4 shows the actions performed during the pairing operation by the kiosk 130 user interface 1303 (Kiosk #1 UX), kiosk 130 kiosk authentication app 1307 (Kiosk #1), the kiosk authentication system server 110 (Kiosk Authentication System Server), the mobile device 140 mobile device authentication app 1407 (User Platform #1A), and the mobile device 140 user interface 1403 (User Platform #1A UX). Each of these elements are shown horizontally across the top of the operational sequence diagram of FIG. 4. The actions performed by each of these elements during the pairing operation are shown vertically below the corresponding element. As an initial task, each kiosk 130 registers with the kiosk authentication system server 110 and the kiosk authentication management system 200 executing therein. The kiosk interface module 210 and the pairing module 220 can service these requests from each of the plurality of kiosks 130. As part of this registration of the kiosk 130, the kiosk 130 can provide a set of configuration information, including a kiosk 130 identifier (e.g., a MAC address or IP address), a kiosk 130 geographical location (e.g., GPS coordinates or location description), a kiosk 130 type or model code, a kiosk 130 configuration, and/or the like. Similarly, each mobile device 140 can register with the kiosk authentication system server 110 and the kiosk authentication management system 200 executing therein. The user platform interface module 215 and the pairing module 220 can service these requests from each of the plurality of mobile devices 140. As part of this registration of the mobile device 140, the mobile device 140 can provide a set of configuration information, including a mobile device 140 identifier (e.g., a MAC address or IP address), a user identifier and related user information, kiosk 130 type or model codes with which the mobile device 140 can be paired, a mobile device 140 configuration, and/or the like. Each kiosk 130 can periodically download from the kiosk authentication system server 110 a list of registered and authorized mobile devices 140 that are allowed to log into the kiosk 130. The kiosk 130 can also periodically download from the kiosk authentication system server 110 a set of public keys associated with the authorized mobile devices 140. The list of authorized mobile devices 140 can also be cached locally on the kiosk 130, making the latency lower. In this case, each time the list is updated, the server 110 can send an update to the relevant kiosks 130.

Upon completion of the registration of the kiosks 130 and the user platforms 140, the kiosk 130 can begin to scan the proximity of the kiosk 130 for a responding mobile device 140. The wireless data network interface 1302 of the kiosk 130 and the wireless data network interface 1402 of the mobile device 140 can be used for this process. Alternatively, the kiosk 130 can use the user interface 1303 to scan for a user action or input at the kiosk 130. If the kiosk 130 detects a user mobile device 140 in the proximity of the kiosk 130, the kiosk authentication app 1307 can receive the mobile device 140 identifier of the proximate mobile device from the mobile device 140. The kiosk authentication app 1307 can use the user interface 1302 to prompt a user of the mobile device 140 to perform a login operation on their mobile device 140. The kiosk authentication app 1307 can also send a list of the mobile device 140 identifiers of the proximate mobile devices to the kiosk authentication management system 200 and the pairing module 220 therein. The pairing module 220 can compare the list of proximate mobile device 140 identifiers received from the kiosk 130 with the registration data corresponding to the registered mobile devices 140. In particular, the pairing module 220 can determine if a particular mobile device 140 detected near a particular kiosk 130 is compatible with and approved for interaction with the kiosk 130 based on the mobile device 140 identifier, the kiosk 130 identifier, the kiosk 130 geographical location, the kiosk 130 type or model code, the kiosk 130 configuration, the user identifier and related user information, the kiosk 130 type or model codes with which the mobile device 140 can be paired, the mobile device 140 configuration, and/or the like. Based on this determination, the pairing module 220 can determine if the proximate mobile device 140 is compatible with and approved for interaction with the kiosk 130. If the pairing module 220 approves the interaction between the proximate mobile device 140 and the kiosk 130, the kiosk authentication app 1307 and the user interface 1303 can prompt the user of the proximate mobile device 140 to perform a login operation on their mobile device 140. The mobile device authentication app 1407 and the user interface 1403 can also prompt the user of the proximate mobile device 140 to perform a login operation on their mobile device 140. Optionally, the user can be prompted to enter a passcode or PIN for a second level of authentication. As a result, the example pairing operation shown in FIG. 4 is complete.

FIG. 5 illustrates an operational sequence diagram showing an example of a user device at a user platform performing a real-time or manual pairing with a kiosk according to an example embodiment of a method as described herein. As an initial task not shown in FIG. 5, a user of a mobile device 140 installs the mobile device authentication app 1407 on their mobile device.

Referring still to FIG. 5, upon completion of the installation of the mobile device authentication app 1407 on the user's mobile device 140, the user can position themselves in front of a particular kiosk 130. The kiosk authentication app 1307 can use the user interface 1303 to prompt a kiosk 130 user to use their mobile device authentication app 1407 to perform a login operation on their mobile device 140. The user prompt can be a message presented on the display device of the kiosk 130 (e.g., user interface 1303). Similarly, the mobile device authentication app 1407 can use the user interface 1403 to query the user of the mobile device 140 to determine if the user wants to perform a login operation for a proximate kiosk 130. The kiosk 130 can begin to scan the proximity of the kiosk 130 for a responding mobile device 140. The wireless data network interface 1302 of the kiosk 130 and the wireless data network interface 1402 of the mobile device 140 can be used for this process. If the kiosk 130 detects a user mobile device 140 in the proximity of the kiosk 130, the kiosk authentication app 1307 can receive the mobile device 140 identifier of the proximate mobile device from the mobile device 140. The kiosk authentication app 1307 can send a list of the mobile device 140 identifiers of the proximate mobile devices to the kiosk authentication management system 200 and the pairing module 220 therein. The mobile device authentication app 1407 can send to the pairing module 220 a mobile device 140 identifier (e.g., a MAC address or IP address), a user identifier, a mobile device 140 geographical location (e.g., GPS coordinates or location description), a mobile device 140 configuration, and/or the like. The mobile device authentication app 1407 can also send to the pairing module 220 a public key corresponding to the particular mobile device 140. The pairing module 220 can compare the list of proximate mobile device 140 identifiers received from the kiosk 130 and the kiosk 130 geographical locations with the mobile device 140 identifier and mobile device 140 geographical location corresponding to the proximate mobile device 140. In particular, the pairing module 220 can determine if a particular mobile device 140 detected near a particular kiosk 130 is compatible with and approved for interaction with the kiosk 130 based on the mobile device 140 identifier, the kiosk 130 identifier, the kiosk 130 geographical location, the mobile device 140 geographical location, the kiosk 130 type or model code, the kiosk 130 configuration, the user identifier and related user information, the kiosk 130 type or model codes with which the mobile device 140 can be paired, the mobile device 140 configuration, and/or the like. Based on this determination, the pairing module 220 can determine if the proximate mobile device 140 is compatible with and approved for interaction with the kiosk 130. If the pairing module 220 approves the interaction between the proximate mobile device 140 and the kiosk 130, the kiosk authentication app 1307 and the user interface 1303 can confirm the pairing of the proximate mobile device 140 and the kiosk 130 and prompt the user of the proximate mobile device 140 to perform a login operation on their mobile device 140. The mobile device authentication app 1407 and the user interface 1403 can also prompt the user of the proximate mobile device 140 to perform a login operation on their mobile device 140 and/or use a kiosk authentication procedure on the proximate mobile device 140 with kiosk 130 information to authenticate with the nearby kiosk 130. Optionally, the user can be prompted to enter a passcode or PIN for a second level of authentication. As a result, the example real-time pairing operation shown in FIG. 5 is complete.

FIG. 6 illustrates an operational sequence diagram showing an example of a user device at a user platform performing a direct pairing with a kiosk according to an example embodiment of a method as described herein. As shown in FIG. 6, the mobile device authentication app 1407 can use the user interface 1403 to query the user of the mobile device 140 to determine if the user wants to perform a login operation for a proximate kiosk 130. The mobile device authentication app 1407 can then use the wireless data network interface 1402 to broadcast messages to kiosks 130 and scan the proximity of the mobile device 140 for a responding kiosk 130. The wireless data network interface 1302 of the kiosk 130 and the wireless data network interface 1402 of the mobile device 140 can be used for this process. If the mobile device 140 detects a kiosk 130 in the proximity of the mobile device 140, the mobile device authentication app 1407 can receive a kiosk 130 identifier (e.g., a MAC address or IP address) of the proximate kiosk from the kiosk 130. The mobile device authentication app 1407 may also receive a kiosk 130 name or descriptor, a kiosk 130 geographical location (e.g., GPS coordinates or location description), a kiosk 130 type or model code, a kiosk 130 configuration, and/or the like. The mobile device authentication app 1407 can use the information received from the proximate kiosk 130 to determine if the particular kiosk 130 detected near the mobile device 140 is compatible with and approved for interaction with the mobile device 140 based on the kiosk 130 identifier, the kiosk 130 name or descriptor, the kiosk 130 geographical location, the kiosk 130 type or model code, the kiosk 130 configuration, the user identifier and related user information, the kiosk 130 type or model codes with which the mobile device 140 can be paired, the mobile device 140 configuration, and/or the like. Based on this determination, the mobile device authentication app 1407 can determine if the proximate kiosk 130 is compatible with and approved for interaction with the mobile device 140. If the mobile device authentication app 1407 approves the interaction between the mobile device 140 and the proximate kiosk 130, mobile device authentication app 1407 can request a pairing operation with the proximate kiosk 130 and provide a specific passcode or PIN associated with the pairing operation. In response to the request for a pairing operation from the mobile device 140, the kiosk authentication app 1307 and the user interface 1303 can accept the pairing with the mobile device 140 and prompt the user at the proximate kiosk 130 to enter the specific passcode or PIN at the proximate kiosk 130 for authentication. Similarly, the mobile device authentication app 1407 and the user interface 1403 can prompt the user of the proximate mobile device 140 to enter the specific passcode or PIN at the proximate kiosk 130 for authentication. Upon entry of the specific passcode or PIN at the proximate kiosk 130, the kiosk authentication app 1307 and the wireless data network interface 1402 can send the entered passcode or PIN directly to the mobile device 140. The mobile device authentication app 1407 can confirm the entry of a valid passcode or PIN at the proximate kiosk 130. If the mobile device authentication app 1407 validates the entry of a valid passcode or PIN at the proximate kiosk 130, the mobile device authentication app 1407 can so notify the kiosk authentication app 1307. Then, the kiosk authentication app 1307 and the user interface 1303 can confirm the pairing of the mobile device 140 and the proximate kiosk 130 and prompt the user of the mobile device 140 to perform a login operation on their mobile device 140. The mobile device authentication app 1407 and the user interface 1403 can also prompt the user of the mobile device 140 to perform a login operation on their mobile device 140 and/or use a kiosk authentication procedure on the mobile device 140 with kiosk 130 information to authenticate with the nearby kiosk 130. As a result, the example direct pairing with a kiosk operation shown in FIG. 6 is complete.

Figure 7:
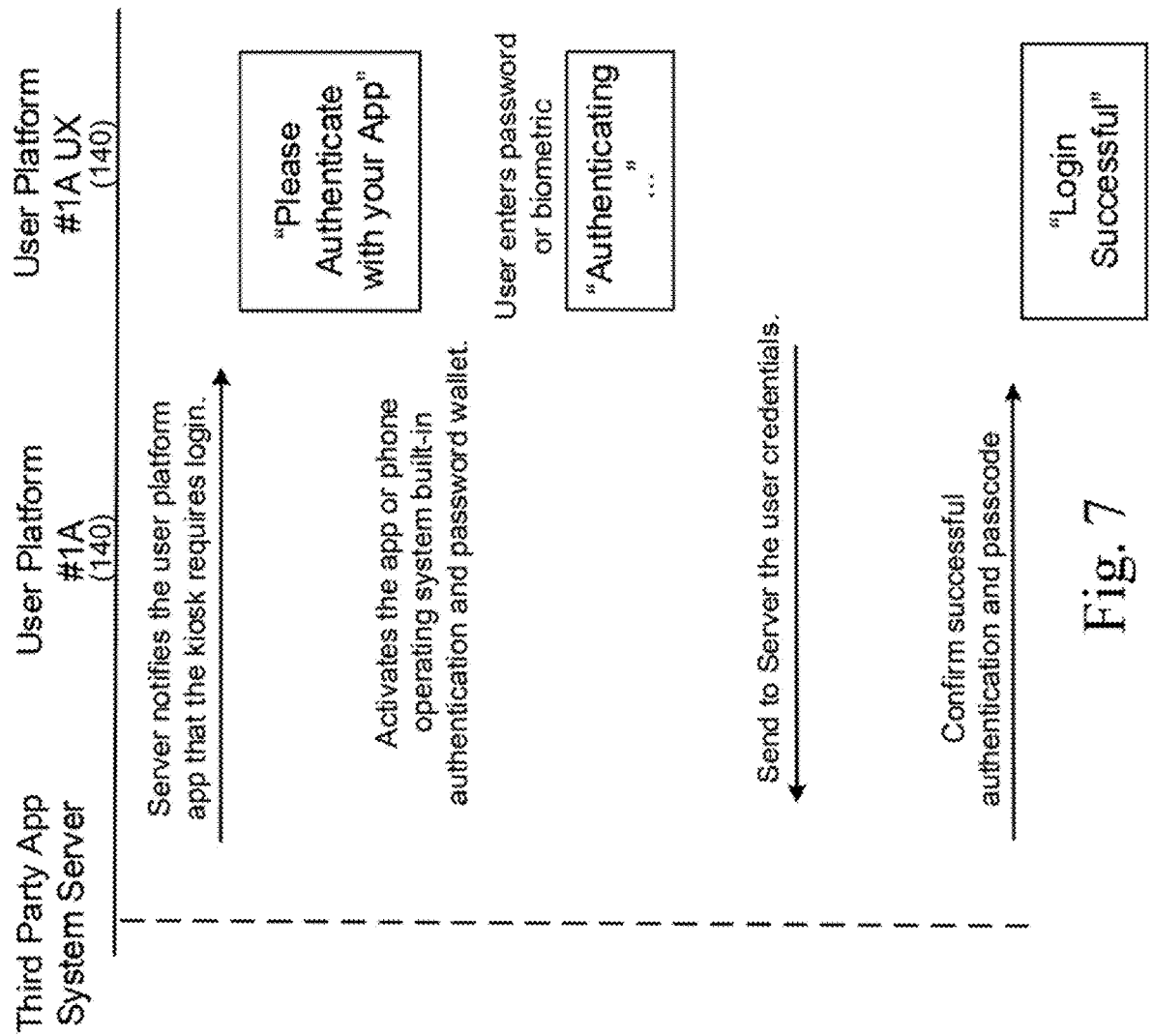
FIG. 7 illustrates an operational sequence diagram showing an example of a user device at a user platform being prompted by a third party application system server to login with a kiosk according to an example embodiment of a method as described herein.

FIG. 7 illustrates an operational sequence diagram showing an example of Stage 2 processing of a user device at a user platform being prompted by a third party application system server to login with a kiosk according to an example embodiment of a method as described herein. As shown in FIG. 7, a third party application system server 150 can send a notification to a mobile device 140 via wide area data network interface 1404. The notification can inform a user at the mobile device 140 that the third party application system requires a login operation at a kiosk 130. The mobile device 140 can receive the notification and prompt the user via the user interface 1403 to activate the mobile device authentication app 1407 on their mobile device 140 and authenticate with the mobile device 140. The authentication or login operation performed by the user on their mobile device 140 can be the standard authentication method used for the particular type of mobile device 140. The standard authentication method for some mobile devices 140 is the entry of a password or passcode. The standard authentication method for other mobile devices 140 is the use of a biometric sensor, such as a fingerprint scanner or facial recognition system. In either case, the example embodiments described herein can leverage the standard authentication methods for mobile devices 140 to verify authentication of the user with the mobile device 140. As such, the mobile device authentication app 1407 can validate the authentication of the user with the mobile device 140. Once the mobile device authentication app 1407 validates the authentication of the user with the mobile device 140, the mobile device authentication app 1407 can obtain private user credentials associated with the authenticated user and the corresponding third party application system. The mobile device authentication app 1407 can use the wide area data network interface 1404 to send the private user credentials to the third party application system server 150. The third party application system server 150 can confirm the validity of the received private user credentials and send a confirmation back to the mobile device authentication app 1407 via the wide area data network interface 1404. In response to this confirmation of a successful user authentication, the mobile device authentication app 1407 can use the user interface 1403 to notify the user of the mobile device 140 of the successful login at the third party application system server 150. As a result, the example third party application system server login shown in FIG. 7 is complete.

Figure 8:
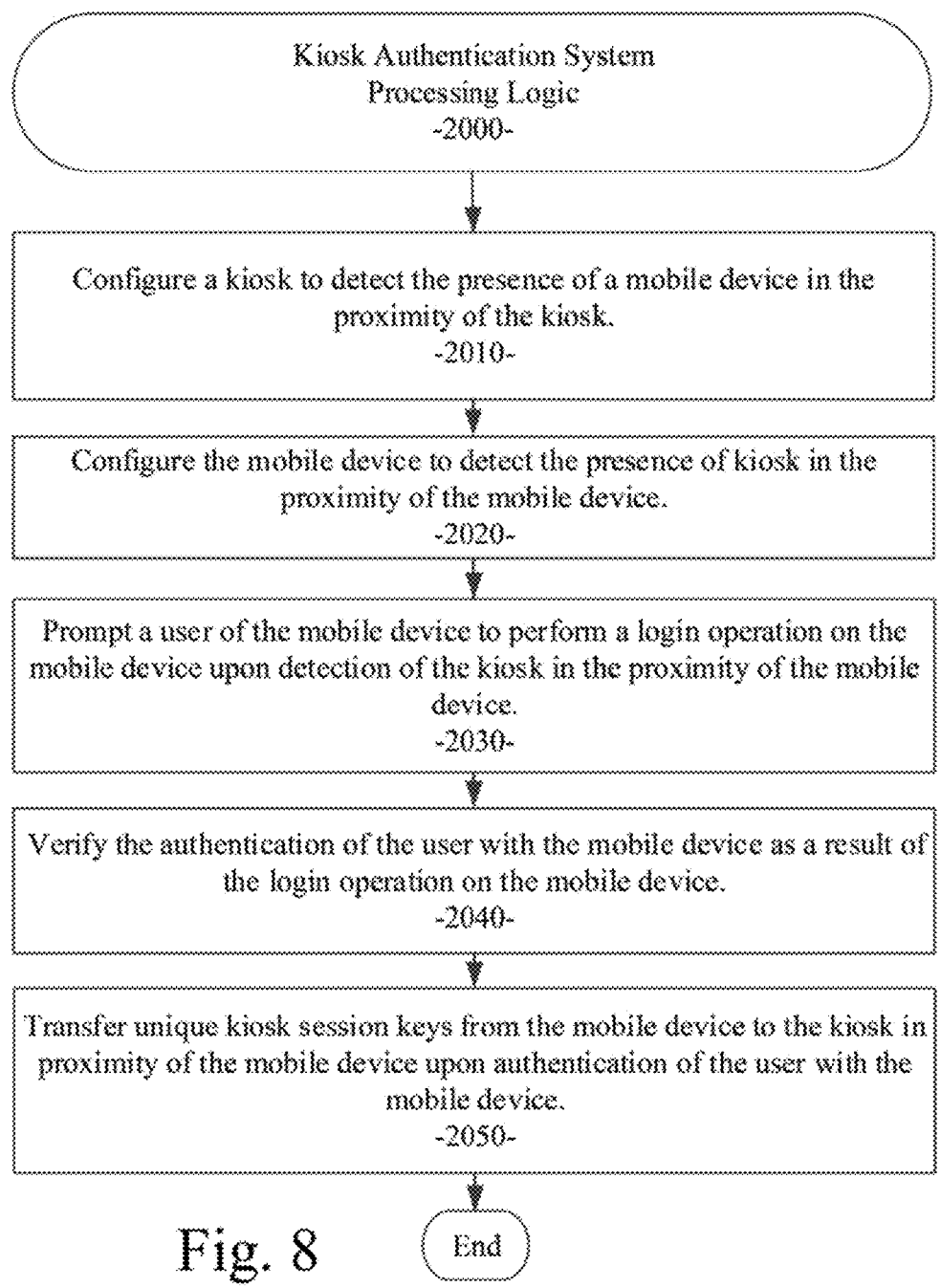
FIG. 8 illustrates a processing flow diagram that illustrates an example embodiment of a method as described herein.

Referring now to FIG. 8, a processing flow diagram illustrates an example embodiment of a method implemented as described herein. The method 2000 of an example embodiment includes: configuring a kiosk to detect the presence of a mobile device in the proximity of the kiosk (processing block 2010); configuring the mobile device to detect the presence of kiosk in the proximity of the mobile device (processing block 2020); prompting a user of the mobile device to perform a login operation on the mobile device upon detection of the kiosk in the proximity of the mobile device (processing block 2030); verifying the authentication of the user with the mobile device as a result of the login operation on the mobile device (processing block 2040); and transferring unique kiosk session keys from the mobile device to the kiosk in proximity of the mobile device upon authentication of the user with the mobile device (processing block 2050).

Figure 9:
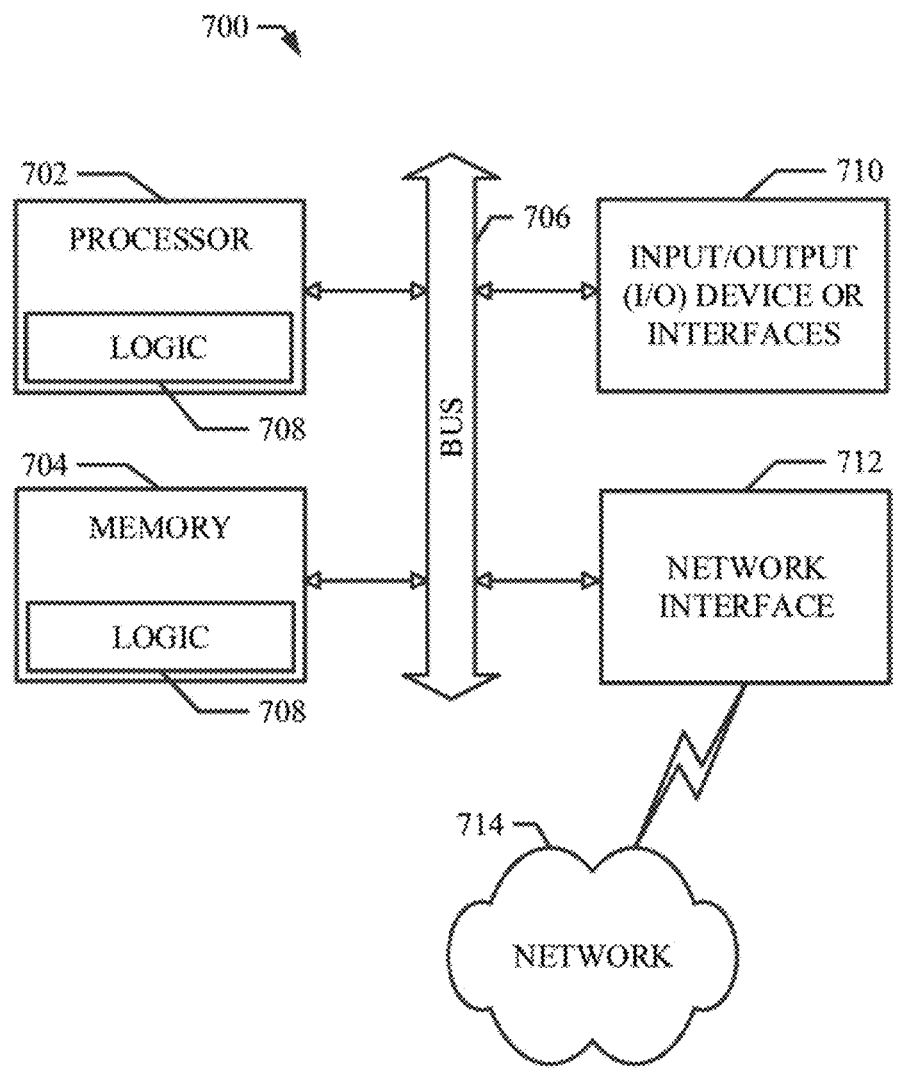
FIG. 9 shows a diagrammatic representation of a machine in the example form of a computer system within which a set of instructions when executed may cause the machine to perform any one or more of the methodologies discussed herein.

FIG. 9 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712.

In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for user authentication at a kiosk from a mobile device are disclosed. In the various example embodiments described herein, a computer-implemented tool or software application (app) as part of a user authentication system in a network ecosystem is described to automate and improve the authentication and verification of parties in a kiosk transaction. As such, the various embodiments as described herein are necessarily rooted in computer and network technology and serve to improve these technologies when applied in the manner as presently claimed. In particular, the various embodiments described herein improve the use of mobile device technology and data network technology in the context of kiosk transactions via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An improved method for user authentication at a kiosk from a mobile device, the method comprising:
    configuring a kiosk to detect the presence of a mobile device of a user in the proximity of the kiosk, the kiosk further configured to facilitate the collection and presentation of the user's medical information at the kiosk after the user is logged in at the kiosk;
    configuring the mobile device to detect the presence of the kiosk in the proximity of the mobile device;
    prompting the user of the mobile device to perform a login operation on the mobile device upon detection of the kiosk in the proximity of the mobile device;
    verifying the authentication of the user with the mobile device as a result of the login operation on the mobile device;
    transferring kiosk session keys from the mobile device to the kiosk in proximity of the mobile device upon authentication of the user with the mobile device;
    initiating a login operation and session on the kiosk using the kiosk session keys transferred from the mobile device without requiring the user to perform a separate login operation or authentication process on the kiosk; and
    enabling the collection and presentation of the user's medical information at the kiosk after the login operation and session initiation on the kiosk is completed using the kiosk session keys transferred from the mobile device.

2. The method of claim 1 further including using a wireless data communication technology to detect the presence of kiosk, the wireless data communication technology being of a type from the group consisting of: Bluetooth™ (BT) and Near-field Communication (NFC).

3. The method of claim 1 wherein the kiosk is configured to include a wide area data network interface.

4. The method of claim 1 wherein the kiosk is configured to include a wide area data network interface and the kiosk is configured to communicate with a kiosk authentication system via the wide area data network interface.

5. The method of claim 1 further including configuring the kiosk and the mobile device to exchange user information and device configuration information upon detection of the kiosk in the proximity of the user mobile device.

6. The method of claim 5 wherein the user information and device configuration information includes a user identity, a mobile device identifier, a kiosk identifier, a kiosk geographical location, a kiosk type code, and a kiosk configuration.

7. The method of claim 1 further including configuring the kiosk to register with a kiosk authentication system via the wide area data network interface.

8. The method of claim 1 further including configuring the mobile device to register with a kiosk authentication system via the wide area data network interface.

9. The method of claim 1 further including transferring the kiosk session keys via a proxy server.

10. A system for improved user authentication at a kiosk from a mobile device, the system comprising:

a kiosk having a first data processor and a wireless network interface, in data communication with the first data processor, for communication on a wireless data network, the kiosk further including a wide area data network interface for communication on a wide area data network;

a mobile device having a second data processor and a wireless network interface, in data communication with the second data processor, for communication on the wireless data network, the mobile device further including a wide area data network interface for communication on the wide area data network; and the kiosk being configured to detect the presence of the mobile device of a user in the proximity of the kiosk, the kiosk further configured to facilitate the collection and presentation of the user's medical information at the kiosk after the user is logged in at the kiosk, the mobile device being configured to detect the presence of the kiosk in the proximity of the mobile device, the mobile device being configured to prompt the user of the mobile device to perform a login operation on the mobile device upon detection of the kiosk in the proximity of the user mobile device, the mobile device being configured to verify the authentication of the user with the mobile device as a result of the login operation on the mobile device; the mobile device being configured to transfer kiosk session keys from the mobile device to the kiosk in proximity of the mobile device upon authentication of the user with the mobile device; the kiosk being configured to initiate a login operation and session on the kiosk using the kiosk session keys transferred from the mobile device without requiring the user to perform a separate login operation or authentication process on the kiosk; and the kiosk being configured to enable the collection and presentation of the user's medical information at the kiosk after the login operation and session initiation on the kiosk is completed using the kiosk session keys transferred from the mobile device.

11. The system of claim 10 being configured to use a wireless data communication technology to detect the presence of kiosk, the wireless data communication technology being of a type from the group consisting of: Bluetooth™ (BT) and Near-field Communication (NFC).

12. The system of claim 10 wherein the kiosk is configured to include a wide area data network interface.

13. The system of claim 10 wherein the kiosk is configured to include a wide area data network interface and the kiosk is configured to communicate with a kiosk authentication system via the wide area data network interface.

14. The system of claim 10 being configured to cause the kiosk and the mobile device to exchange user information and device configuration information upon detection of the kiosk in the proximity of the user mobile device.

15. The system of claim 14 wherein the user information and device configuration information includes a user identity, a mobile device identifier, a kiosk identifier, a kiosk geographical location, a kiosk type code, and a kiosk configuration.

16. The system of claim 10 being configured to cause the kiosk to register with a kiosk authentication system via the wide area data network interface.

17. The system of claim 10 being configured to cause the mobile device to register with a kiosk authentication system via the wide area data network interface.

18. The system of claim 10 being configured to transfer the kiosk session keys via a proxy server.

19. A non-transitory machine-useable storage medium embodying instructions which, when executed by a machine, cause the machine to:

configure a kiosk to detect the presence of a mobile device of a user in the proximity of the kiosk, the kiosk further configured to facilitate the collection and presentation of the user's medical information at the kiosk after the user is logged in at the kiosk;

configure the mobile device to detect the presence of the kiosk in the proximity of the mobile device;

prompt the user of the mobile device to perform a login operation on the mobile device upon detection of the kiosk in the proximity of the mobile device;

verify the authentication of the user with the mobile device as a result of the login operation on the mobile device;

transfer kiosk session keys from the mobile device to the kiosk in proximity of the mobile device upon authentication of the user with the mobile device;

initiate a login operation and session on the kiosk using the kiosk session keys transferred from the mobile device without requiring the user to perform a separate login operation or authentication process on the kiosk; and enable the collection and presentation of the user's medical information at the kiosk after the login operation and session initiation on the kiosk is completed using the kiosk session keys transferred from the mobile device.

20. The non-transitory machine-useable storage medium of claim 19 being further configured to use a wireless data communication technology to detect the presence of kiosk, the wireless data communication technology being of a type from the group consisting of: Bluetooth™ (BT) and Near-field Communication (NFC).

* * * * *